United States Patent
Lim et al.

(10) Patent No.: US 12,464,588 B2
(45) Date of Patent: Nov. 4, 2025

(54) FORWARDING METHOD AND SYSTEM FOR DATA BROADCAST REDUCTION BASED ON NAME CENTRICITY AND APPLIED IN VEHICLE NAMED DATA NETWORKING

(71) Applicant: HOSEO UNIVERSITY ACADEMIC COOPERATION FOUNDATION, Asan-si (KR)

(72) Inventors: Huhnkuk Lim, Daejeon (KR); Inayat Ali, Daejeon (KR)

(73) Assignee: HOSEO UNIVERSITY ACADEMIC COOPERATION FOUNDATION, Asan-si (KR)

( * ) Notice: Subject to any disclaimer, the term of this patent is extended or adjusted under 35 U.S.C. 154(b) by 456 days.

(21) Appl. No.: 17/993,993

(22) Filed: Nov. 25, 2022

(65) Prior Publication Data

US 2023/0217522 A1    Jul. 6, 2023

(30) Foreign Application Priority Data

Dec. 30, 2021    (KR) ........................ 10-2021-0192759

(51) Int. Cl.
*H04W 76/16* (2018.01)
*H04B 17/318* (2015.01)
*H04W 52/02* (2009.01)

(52) U.S. Cl.
CPC .......... *H04W 76/16* (2018.02); *H04B 17/318* (2015.01); *H04W 52/0206* (2013.01)

(58) Field of Classification Search
CPC ... H04W 76/16; H04W 52/0206; H04W 4/06; H04W 4/46; H04W 40/125; H04B 17/318; H04L 45/26; H04L 45/38; H04L 45/54; H04L 45/70; H04L 2101/35; H04L 67/63

See application file for complete search history.

(56) References Cited

U.S. PATENT DOCUMENTS

| | | | |
|---|---|---|---|
| 2016/0173386 A1* | 6/2016 | Garcia-Luna-Aceves | ................... H04L 45/122 709/238 |
| 2020/0412635 A1* | 12/2020 | Jha | ....................... H04L 67/1014 |
| 2020/0412836 A1* | 12/2020 | Arrobo Vidal | ........ H04L 67/568 |
| 2022/0116315 A1* | 4/2022 | Zhang | ..................... H04L 43/12 |

FOREIGN PATENT DOCUMENTS

KR         10-2327947 B1     11/2021

* cited by examiner

*Primary Examiner* — Robert C Scheibel
*Assistant Examiner* — Muhammad Ainul Huda
(74) *Attorney, Agent, or Firm* — YOU & IP, LLC

(57) ABSTRACT

A forwarding method and system for data broadcast reduction in a Vehicle Named Data Networking (VNDN) is proposed. The method includes (a) setting name centrality (NameCent) count data with respect to an interest packet received by a node of the VNDN; (b) measuring, by a Received Signal Strength Indicator (RSSI), a power level of signal received from an access point (AP) or any other vehicle in wireless communication; (c) calculating a weight of the interest packet for a data forwarder in a current node or a previous node based on the name centrality (NameCent) count data and signal strength measured by the Received Signal Strength Indicator (RSSI); and (d) determining a potential forwarder of a data packet by comparison of variables of the weight calculated in step (c).

6 Claims, 13 Drawing Sheets

FORWARDING METHOD AND SYSTEM FOR DATA BROADCAST REDUCTION BASED ON NAME CENTRICITY AND APPLIED IN VEHICLE NAMED DATA NETWORKING

CROSS REFERENCE TO RELATED APPLICATION

The present application claims priority to Korean Patent Application No. 10-2021-0192759, filed Dec. 30, 2021, the entire contents of which is incorporated herein for all purposes by this reference.

SPECIFIC REFERENCE TO A GRACE PERIOD INVENTOR DISCLOSURE

This invention has been published in the IEEE Access (SCIE Indexed, IF:3.336) on Dec. 6, 2021.

BACKGROUND OF THE INVENTION

Field of the Invention

The present disclosure relates to a forwarding method and system for data broadcast reduction, wherein controlling and forwarding packets is performed for realizing an infotainment application service under a VNDN environment.

Description of the Related Art

Vehicle Ad-hoc Network (VANET) is one of representative subclass technologies of Mobile Ad-hoc Network (MANET) applied to roads for smart vehicles. The smart vehicles within the VANET constitute respective mobile nodes. The VANET suffers from broadcasting intermediation problems to all the vehicles for data delivery. The active safety and intelligent transportation fields that require appropriate routing technology in V2V communication technologies are major applications of the VANET.

As for connected vehicles using the TCP/IP technologies as conventional core network technologies, there are possibilities of hacking, and during frequent handoffs for infotainment application services, there are limitations of the host-centric Internet where data interruption occurs, performance degradation occurs during long-distance data transmission, and so forth.

Recently, in order to solve these problems, a lot of research on Vehicle NDN (VNDN) technology has been conducted to incorporate Named Data Networking (NDN), which uses data names when data is transmitted to VANET, as a core network technology. In the VNDN, due to broadcast characteristics of wireless media, an interest packet, which is a packet for requesting content, is received by multiple nodes, and in sequence, each node inserts a Pending Interest Table (PIT) item for a mentioned name into the corresponding interest packet. Next, a data packet including the name and actual requested content are broadcast to users.

Data is processed by all the nodes each having the PIT item corresponding to the relevant named content, and is further re-broadcast, thereby causing a data broadcast storm problem in VNDN. Since the data broadcast storm amplifies duplicate copies of a large-volume data packet, there are problems that congestion is caused in a network, bandwidth resources are wasted, and packet loss and additional delay is induced when content is retrieved. Accordingly, a phenomenon of data packet explosion in a VNDN environment is an important issue required to be resolved in order to realize services for connected vehicle infotainment content.

In this regard, no prior patent document is found, but there is Korean Patent No. 2327947 as a reference related to a broadcast technique. The above-mentioned prior patent discloses a method of controlling broadcasting of push-based data in an information-centric IoT environment. The above-mentioned prior patent document is proposed to solve the data broadcast storm problem that occurs in the conventional ICN-based IoT environment, and is proposed to disclose a push-based data broadcast control method for limiting flooding of push-based data transmitted to consumers through a naming scheme in the ICN-based IoT environment.

DOCUMENTS OF RELATED ART (Patent Document 1) Korean Patent No. 10-2327947

SUMMARY OF THE INVENTION

The present disclosure proposes a network processing method based on name centrality and signal strength, and an objective of the present disclosure is to provide an interest/data packet forwarding algorithm that may reduce a data broadcast storm and exhibit excellent network performance.

In the present disclosure for achieving the above objective, there is provided a forwarding method for data broadcast reduction in a Vehicle Named Data Networking (VNDN), the method including: (a) setting name centrality (NameCent) count data with respect to an interest packet received by a node of the VNDN; (b) measuring, by a Received Signal Strength Indicator (RSSI), a power level of signal received from an access point (AP) or any other vehicle in wireless communication; (c) calculating a weight of the interest packet for a data forwarder in a current node or a previous node based on the name centrality (NameCent) count data and signal strength measured by the Received Signal Strength Indicator (RSSI); and (d) determining a potential forwarder of a data packet by comparison of variables of the weight calculated in step (c).

Preferably, in step (a), by setting, as a variable, an interest of the same content data for which a specific node receives requests from other nodes, a value of counting interests may be set as the name centrality (NameCent) count data.

Preferably, in step (a), the set count value of the name centrality (NameCent) may be smaller than the number of other nodes adjacent to the specific node.

Preferably, step (d) may include constructing a centrality table CT, wherein a prefix of each node, a weight value $P_{nw}$ of the previous node calculated in step (c), a weight value $C_{nw}$ of the current node, and a name centrality count value $N_{CC}$ calculated in step (a) are stored in a table in which an expiration counter of data storage is set.

Preferably, in step (c), each weight may be calculated with logic of the following [Equation 1]:

$$W_{in} = \left\{ \alpha \times \left( \frac{RSSI_{Fin}}{RSSI_{max}} \right) + (1-\alpha) \times \left( \frac{NameCent_{Fin}}{NameCent_{man}} \right) \right\} \quad \text{[Equation 1]}$$

(where, $W_{in}$ denotes weight of requested prefix (n) of forwarder (i), $RSSI_{Fin}$ denotes value of received signal strength indicator, $RSSI_{max}$ denotes maximum value of received signal strength indicator, $NameCent_{Fin}$ denotes name centrality count value of requested prefix (n) of forwarder (i), $NameCent_{max}$ denotes maximum name centrality count value of requested prefix (n) of forwarder (i), and α denotes weight factor).

Preferably, in step (d), a node having a weight $C_{nw}$ greater than or equal to a weight $C_{nw}$ calculated from the current node may be determined as a potential data forwarder of the data packet.

In addition, in the present disclosure, there is provided a forwarding system for data broadcast reduction in a Vehicle Named Data Networking (VNDN), the system providing a content data service to a connected vehicle equipped with a Received Signal Strength Indicator (RSSI) and a sensor node and including: (a) module configured to set name centrality (NameCent) count data with respect to an interest packet received by a node of the VNDN; (b) module configured to measure, by the Received Signal Strength Indicator (RSSI), a power level of signal received from an access point (AP) or any other vehicle in wireless communication; (c) module configured to calculate a weight of the interest packet for a data forwarder in a current node or a previous node based on the name centrality (NameCent) count data and signal strength measured by the Received Signal Strength Indicator (RSSI); and (d) module configured to determine a potential forwarder of a data packet by comparison of variables of the weight calculated in step (c).

According to the present disclosure, a novel method based on the name centrality is introduced as a process of selecting a more limited subset node when data is delivered to users in VNDN, and thus, compared to the broadcast method based on node centrality, an accurate and efficient matrix is provided to select a data-forwarding transmitter node. According to the present disclosure, the data broadcast storm may be reduced without adding supplementary control overhead to the network.

DETAILED DESCRIPTION OF THE INVENTION

Figure 1:
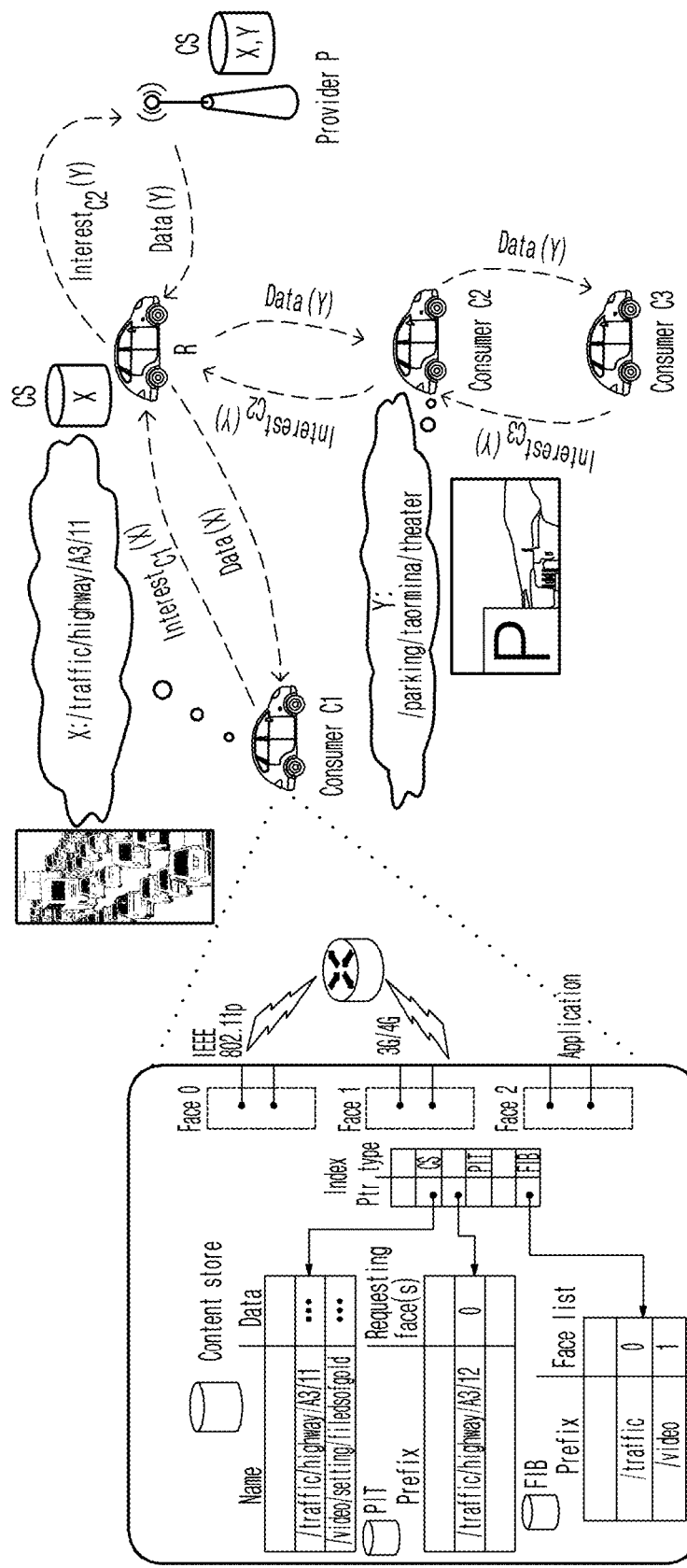
FIG. 1 is a view illustrating an interest/data packet forwarding structure of VNDN.

Hereinafter, the present disclosure will be described in detail with reference to the accompanying drawings. However, the present disclosure is not restricted or limited by the exemplary embodiments. The same reference numerals in each drawing indicate members that perform substantially the same functions.

Objectives and effects of the present disclosure may be naturally understood or more clearly understood by the following description, and the objectives and effects of the present disclosure are not limited only by the following description. In addition, in describing the present disclosure, when it is determined that a detailed description of a known technology related to the present disclosure may unnecessarily obscure the subject matter of the present disclosure, the detailed description thereof will be omitted.

Connected vehicles are more likely to seek information (i.e., a data centrality model) than to have peer-to-peer (P2P) connections with other vehicles (i.e., a node centrality model) for infotainment applications such as for weather forecasting, traffic jams, and emergencies, etc. Meanwhile, in the vehicle infotainment applications, it is essential to effectively distribute data related to reliable and safe content or important information between a vehicle and a vehicle and between a vehicle and a Road Side Unit (RSU).

VNDN uses data names for data transmission. In the VNDN, a namespace for all application content should be defined and names of structured and unique content should be shared. A vehicle may fetch data from all adjacent vehicles, but when a data source is unable to be directly used from the adjacent vehicles in a highly mobile and flexible network such as VANET, each adjacent vehicle should perform a function of forwarding an interest packet for the content requested by a consumer vehicle. In the VNDN, the consumer vehicle transmits the interest packet (i.e., the request message) for the content, and a producer or router, having the data corresponding to a name contained in the interest packet, forwards the corresponding content to the consumer. Each NDN node (i.e., the consumer, the producer, and the router) uses information on three kinds of a table content store (CS), a pending interest table (PIT), and forwarding information base (FIB) table, so as to intermediate Interest/Data packets to a next NDN node. In NDN nodes, the content store (CS) is used as a temporary storage, and content that may be used in the future is stored in the content store (CS). The FIB is name table information for forwarding the interest packet.

The Pending Interest Table (PIT) writes a record that to which node each content name delivered by the received interest packet is delivered, and is used as a name table for forwarding data packets when the data packets corresponding to respective content names arrive. As a result of analyzing a PIT of NDN, it is known that a high level of node centrality is never advantageous to a process of forwarding data to a consumer. Accordingly, in the present exemplary embodiment, the term "name centrality" is defined to replace the node centrality, so that an indicator, which may select an enhanced and efficient node for forwarding the data to the consumer, is introduced.

FIG. 1 is a view illustrating an interest/data packet forwarding structure of VNDN. Referring to FIG. 1, the VNDN provides forwarding functions, such as intra-network caching, multicast forwarding, multipath forwarding, and data authentication, which are difficult in IP-based routing. For an efficient architecture based on VANET, VNDN should take into account, in a design thereof, naming, routing/forwarding, caching, security/privacy, mobility support, and the like. In a VNDN environment, a connected vehicle may broadcast an interest packet in order to request desired data, thereby causing a data explosion phenomenon due to successive intermediaries of the same data from multiple intermediary nodes. In the following exemplary embodiment, a novel forwarding method and system that may alleviate the data explosion phenomenon referred to as the data broadcast storm will be described.

The forwarding method for the data broadcast reduction in the VNDN according to the present exemplary embodiment may include: (a) setting name centrality; (b) measuring a power level of RSSI; (c) calculating a weight; and (d) determining a potential forwarder. The forwarding method for the data broadcast reduction in the VNDN according to the present exemplary embodiment may be implemented as a system. In the present exemplary embodiment, the forwarding system for data broadcast reduction in the vehicle named data networking (VNDN) for delivering content data services to connected vehicles provided with a Received Signal Strength Indicator (RSSI) and a sensor node may include each module in which steps (a) to (d) are performed.

In step (a), name centrality (NameCent) count data may be set in an interest packet received by a node of Vehicle Named Data Networking (VNDN). The interest packet delivers a nonce. When the node (i.e., a vehicle) requests content in the VNDN, a network broadcasts the interest packet including name information of the requested content. Afterwards, such an interest is received by a neighboring node, and forwarding of the VNDN is performed. A process in which the nonce delivered by the interest packet is checked with a Dead Nonce List (DNL) is performed. When matching is successful in a DNL list check process, the interest is considered as a loop and dropped. When the DNL does not match the interest, then PIT checking is performed. When a PIT match is found, the interest is dropped through loop logic. When there is no item in the PIT, a PIT item for the corresponding interest is generated, and then retrieval of content store (CS) occurs. When data is found in the CS retrieval, the data is broadcast to a consumer. When the CS retrieval fails, the item of the interest is stored in forwarding information base (FIB) on the basis of a longest prefix match. In such a process, a data packet is received by the VNDN node.

Figure 2:
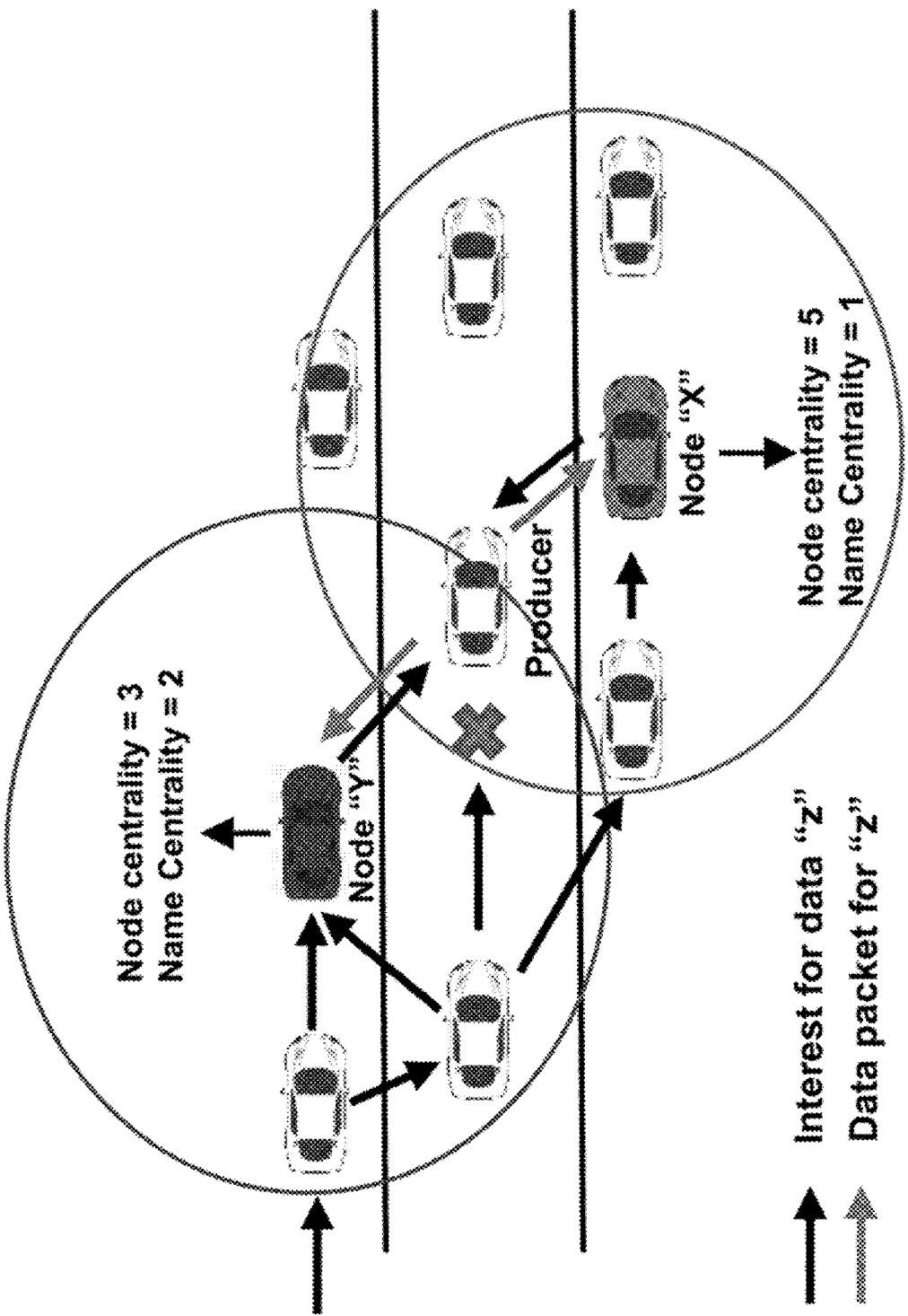
FIG. 2 is a view illustrating an exemplary case of setting name centrality of the VNDN according to an exemplary embodiment of the present disclosure.

FIG. 2 is a view illustrating an exemplary case of setting name centrality of the VNDN according to the exemplary embodiment of the present disclosure. In the present specification, a novel term "name centrality (NameCent)" is introduced. The name centrality is a term defined to distinguish it from node centrality belonging to a traditional NDN. FIB stores information as name prefixes rather than IP addresses. Note that the "name centrality" defined in the present specification is based on a prefix of a node.

In step (a), by setting, as a variable, an interest of the same content data for which a specific node receives requests from other nodes, a value of counting interests may be set as name centrality count data. In the present specification, the name centrality refers to numeric information of an interest on the same content received from each node.

In step (a), the set count value of the name centrality (NameCent) is smaller than the number of other nodes adjacent to the specific node. Referring to FIG. 2, a vehicle "X" has five other vehicle nodes in one wireless communication range, and a vehicle "Y" has three other vehicle nodes in the other wireless communication range. Accordingly, an X node (Node centrality=5) has a higher level of node centrality than that of a Y node (Node centrality=3).

Whereas, when the case of FIG. 2 is referred to with the name centrality defined in the present specification, the node X receives an interest packet for data "z" from one adjacent vehicle, and has one piece of the name centrality (Name centrality=1). The node Y receives interests for the data "z" from two adjacent vehicles, and has two pieces of the name centrality (Name Centrality=2). When it is assumed that the vehicle X node and vehicle Y node receive data packets at the same time, the vehicle X node in which five nodes are formed may become an appropriate forwarder in the node centrality basis, but in the name centrality basis according to the present exemplary embodiment, the vehicle Y node would be a more appropriate forwarder.

With this definition of the name centrality, the number of prefixes is always less than or equal to the number of levels of the node centrality. The node centrality is based on units of nodes, whereas the name centrality is based on units of prefixes.

In step (b), a power level of signal received from an access point (AP) or any other vehicle in wireless communication may be measured by a received signal strength indicator (RSSI).

Figure 3:
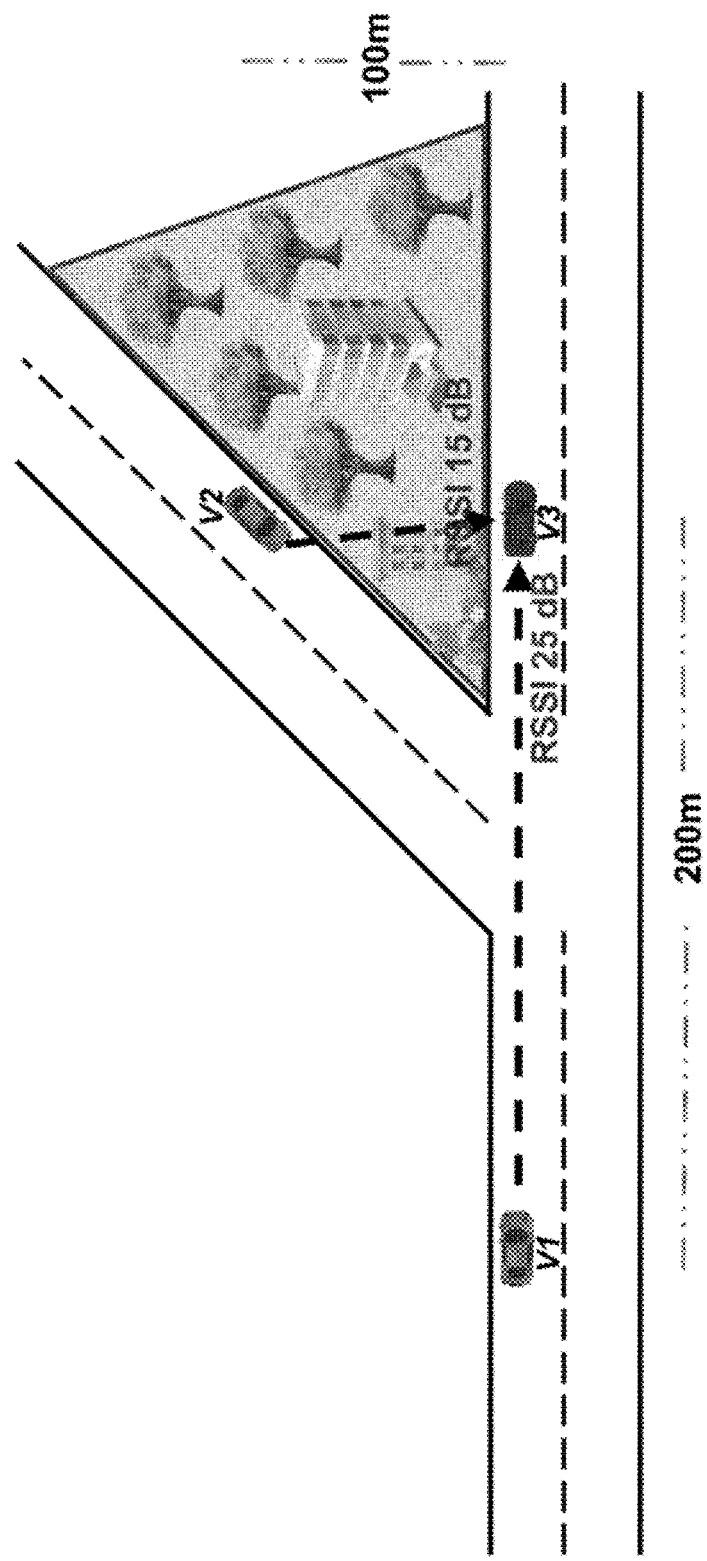
FIG. 3 is a view illustrating an exemplary example of measuring RSSI levels of the VNDN according to the exemplary embodiment of the present disclosure.

FIG. 3 is a view illustrating an exemplary example of measuring RSSI levels of the VNDN according to the exemplary embodiment of the present disclosure. A level of RSSI may reflect strength or time to live of a connection between two wireless devices. A high level of RSSI signal refers that the two wireless devices are physically close or are in a low interference path. Referring to FIG. 3, it is exemplified that levels of RSSI are different when vehicle V1 and vehicle V2 have the same value in name centrality of particular prefixes. Although the vehicle V2 and vehicle V3 are close in distance, a stronger RSSI signal may be measured in more distant vehicle V1. The reason is that signal reception strength is decreased due to obstacles such as trees or buildings in a relationship between the vehicle V2 and the vehicle V3.

The forwarding method for the data broadcast reduction according to the present exemplary embodiment selects a stronger and more reliable forwarder node by using two indicators including RSSI level and name centrality.

In step (c), a weight of the interest packet for each data forwarder in a current node or previous node may be calculated on the basis of the name centrality count data and the signal strength measured by the RSSI. In more detail, in step (c), the weight may be calculated with logic of the following [Equation 1].

$$W_{in} = \left\{ \alpha \times \left( \frac{RSSI_{Fin}}{RSSI_{max}} \right) + (1-\alpha) \times \left( \frac{NameCent_{Fin}}{NameCent_{man}} \right) \right\} \quad \text{[Equation 1]}$$

Where, $W_{in}$ denotes weight of requested prefix (n) of forwarder (i), $RSSI_{Fin}$ denotes value of received signal strength indicator, $RSSI_{max}$ denotes maximum value of received signal strength indicator, $NameCent_{Fin}$ denotes name centrality count value of requested prefix (n) of forwarder (i), $NameCent_{max}$ denotes maximum name centrality count value of requested prefix (n) of forwarder (i), and $\alpha$ denotes weight factor.

Since a forwarded interest from a first data chunk of any node is given a number 1, a name centrality count $N_{cc}$ may have an initial value of 1. Accordingly, a weight of the first interest packet may be rewritten as [Equation 2].

$$W_{in} = \left\{ \alpha \times \left( \frac{RSSI_{Fin}}{RSSI_{max}} \right) \right\} \quad \text{[Equation 2]}$$

As the interest packet is followed, $N_{cc}$ is continually updated. The update of the $N_{cc}$ may be performed on the basis of [Equation 1]. As an example, the weight in [Equation 1] of the name centrality is determined from a prefix ( . . . /prefix/n−1) of the name centrality where a prefix ( . . . /prefix/n) of a first forwarder i is actually determined from a previous node, and the prefix ( . . . /prefix/n−1) is determined from a prefix ( . . . /prefix/n−2).

Step (d) may include constructing a centrality table (CT), wherein a prefix of each node, a weight value $P_{nw}$ of a previous node calculated in step (c), a weight value $C_{nw}$ of a current node, and a name centrality count value $N_{cc}$ calculated in step (a) are stored in a table in which an expiration counter of data storage is set. As the expiration counter is set, memory overhead of each node due to the CT may be prevented.

The centrality table CT may be shown in [Table 1] below.

TABLE 1

| Prefix | Pnw | Ncc | Cnw |
|---|---|---|---|
| v2v/traffic/test/01 | 0.5 | 4 | 0.3 |
| v2v/traffic/test/02 | 0.67 | 6 | 0.78 |
| v2v/traffic/test/03 | 0.3 | 4 | 0.66 |
| . | . | . | . |
| . | . | . | . |
| . | . | . | . |

When an interest packet is received into the CT, an $N_{cc}$ value increases, and [Equation 1] is used. Similarly, when a data packet is received by a node, the node will have a weight value $C_{nw}$, which is a main indicator in the CT for determining a forwarder who transmits the data packet.

In step (d), a potential forwarder of the data packet may be determined by comparing variables of the weight calculated in step (c). In step (d), a node having a weight $C_{nw}$ greater than or equal to a weight $C_{nw}$ calculated from a current node may be determined as a potential data forwarder of the data packet.

In step (d), a process of receiving and processing each interest with reference to the CT may be summarized as [Algorithm 1].

---

[Algorithm 1]
Algorithm 1 Interest Received in the Proposed Scheme

Received: [Name, selector (s), NONCE, weight]
    Cnw: Current node weight
    Pnw: Previous node weight
    Ncc: Name centrality count
    CT: Centrality Table
1:    if (Nonce not in DNL) then
2:      if (Name not in PIT) then
3:        Add [Name, NONCE, Face] in PIT
4:        Add [prefix, Pnw = weight, Ncc] in CT
5:        Get Ncc from CT and calculate Cnw using (1)
6:        Put Cnw in CT
7:        if (Content Not in CS ) then
8:          weight = Cnw
9:          Forward Interest using FIB
10:        else
11:          Take average of all the Pnws for the prefix
12:          Data packet weight field = average (pnw)
13:          Send Data
14:        end if
15:      else
16:        Increment Ncc value in CT
17:        if (Name == prefix && weight >= pnw) then
18:          Pnw = weight (Update Pnw)
19:          Drop Interest
20:        end if
21:      end if
22:    else
23:      Drop Interest
24:    end if

---

Referring to [Algorithm 1], the process when VNDN receives each interest is as follows. When each interest is received, a nonce is checked by loop detection of DNL. When matching the DNL, a corresponding interest is dropped. The corresponding interest is then checked in PIT. When a name does not match with an item in the PIT, the prefix, weight, and $N_{cc}$ of the corresponding interest are stored in CT. The weight value $P_{nw}$ of the previous node is copied from the interest packet. In a next step, $N_{cc}$ is extracted from the CT, and the weight $C_{nw}$ of the current node is calculated by [Equation 1]. When the name already exists in the PIT, the corresponding interest packet is dropped because of corresponding to a duplicate or loop interest. However, the $N_{cc}$ value is increased before dropping, and when the weight value of the corresponding interest is greater than or equal to the weight that is present in the current CT, the $P_{nw}$ is updated by a process of steps 15 to 18 of [Algorithm 1]. When content is retrieved from CS, all $P_{nw}$s in the current name prefixes are taken, and an average obtained from all the $P_{nw}$s is copied and broadcast.

Figure 4:
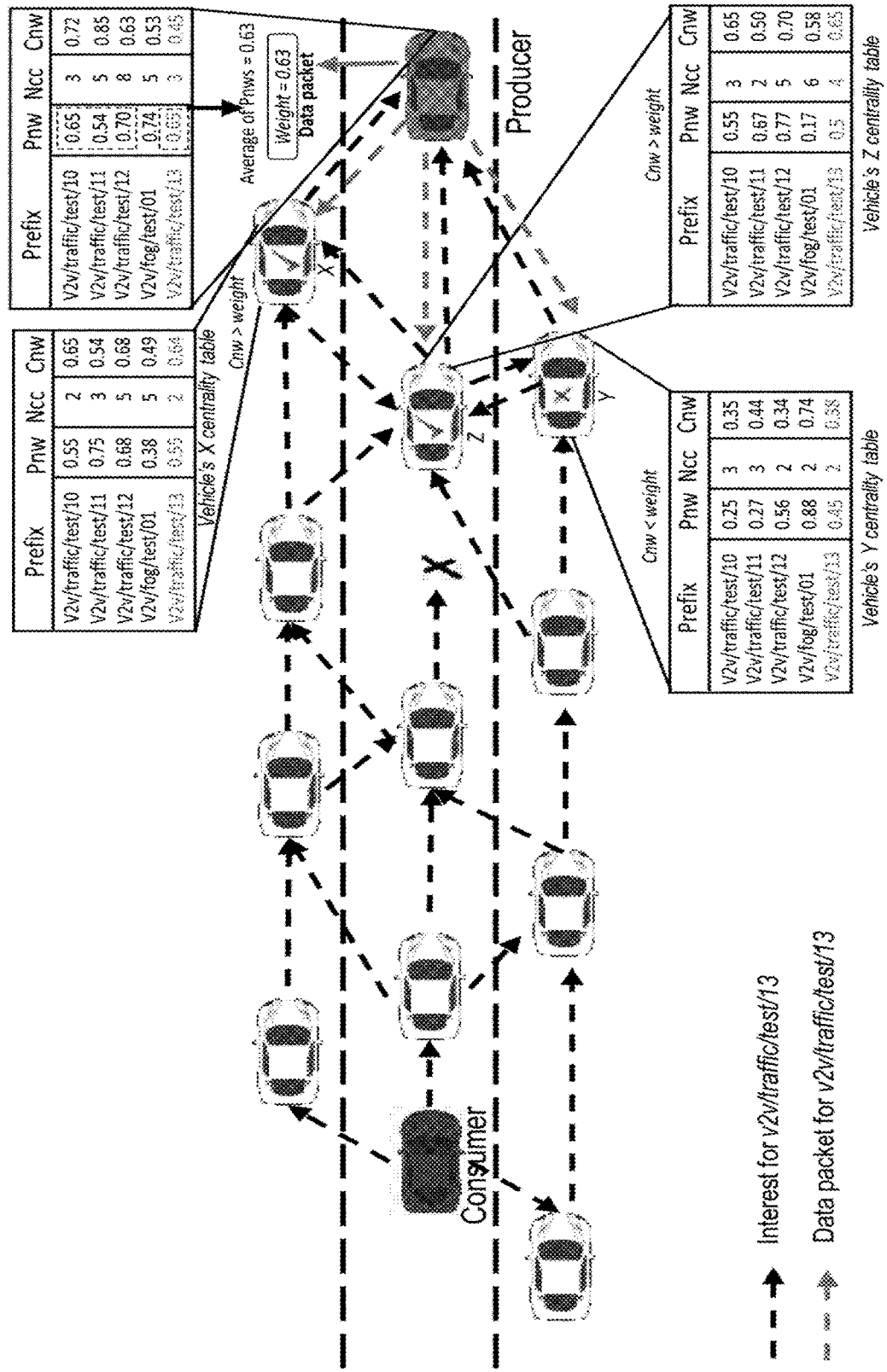
FIG. 4 is a view illustrating a case of determining a potential forwarder of the VNDN according to the exemplary embodiment of the present disclosure.

FIG. 4 is a view illustrating a case of determining a potential forwarder of the VNDN according to the exemplary embodiment of the present disclosure. A procedure in which a data packet is processed in VNDN is the same as [Algorithm 2].

---

[Algorithm 2]
Algorithm 2 Data Packet Received in the Proposed Scheme

Received: [Name, MetaInfo, Content, weight]
1:    if (Name in PIT) then
2:      if (Face is Application) then
3:        Node Received Data
4:      else
5:        if (Cnw >= weight) then
6:          Take average of all the Pnws for the prefix
7:          Data packet weight field = average(pnws)
8:          Cache policy
9:          Send Data
10:          Remove PIT entry
11:        else
12:          Drop Data
13:          Remove PIT entry
14:        end if
15:      end if
16:    else
17:      Drop Data
18:    end if

---

A value of $C_{nw}$ taken from the CT is compared with values in weight fields of a data packet. FIG. 4 illustrates a process of requesting content by a consumer and a process of broadcasting data from a producer. FIG. 4 illustrates the weight fields as a table of CT. Before the data packet is broadcast, the weight fields of the CT are updated with an average of current nodes of $P_{nw}$.

Nodes X, Y, and Z exemplify respective potential forwarders that receive the data packet from the producer. The nodes X, Y, and Z receive a weight value of the average $P_{nw}$ in a producer node from the producer. The weight value is compared with $C_{nw}$ of each node. In the case of FIG. 4, each of the $C_{nw}$ of node X and the $C_{nw}$ of node Z has a value greater than or equal to the weight value of the data packet. Accordingly, in step (d), the nodes X and Z may be set as respective next forwarders except for node Y having a small $C_n$, value.

Figure 5A:
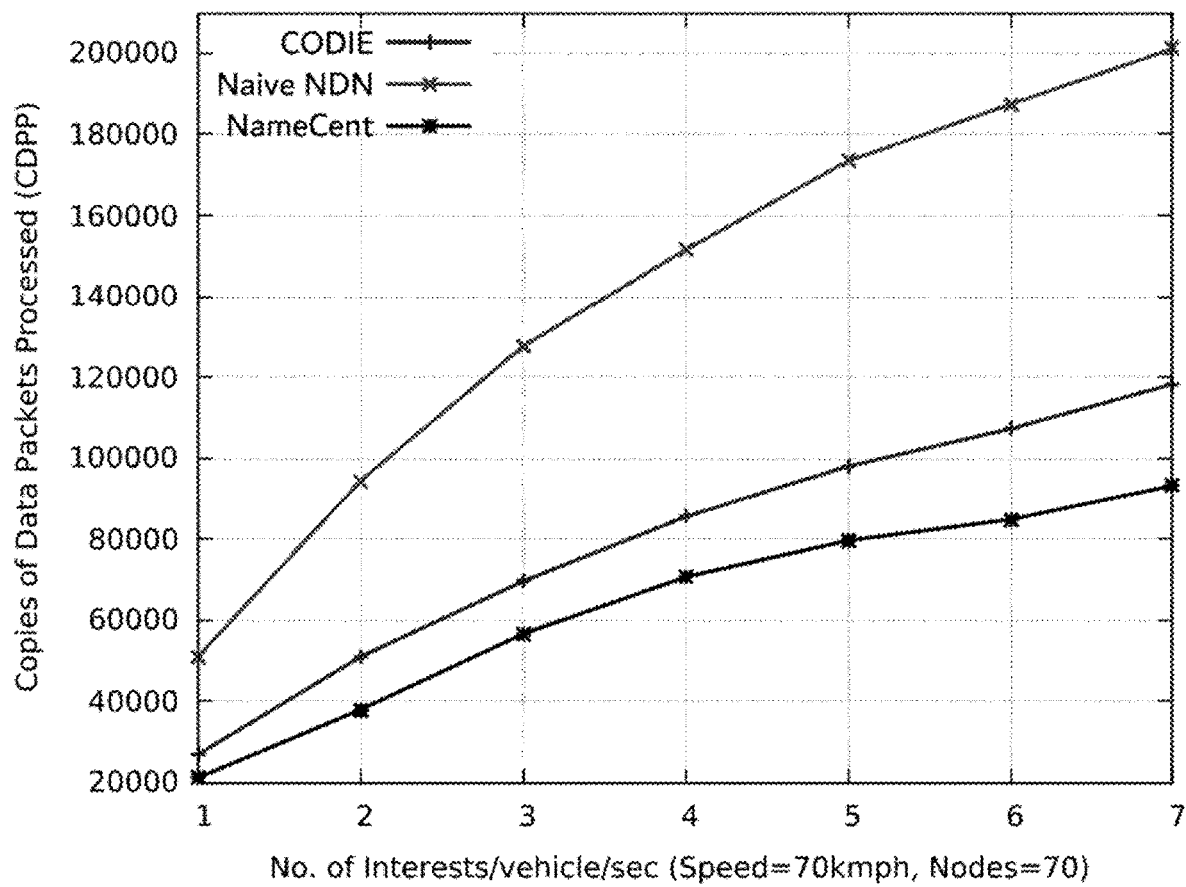
FIGS. 5A to 5C are views respectively illustrating experimental examples of the present disclosure, and illustrate Copies of Data Packets Processed (CDPP) and speed evaluation results of a proposed model (i.e., NameCent) of the present disclosure and existing models (i.e., NDN and CODIE).
Figure 5B:
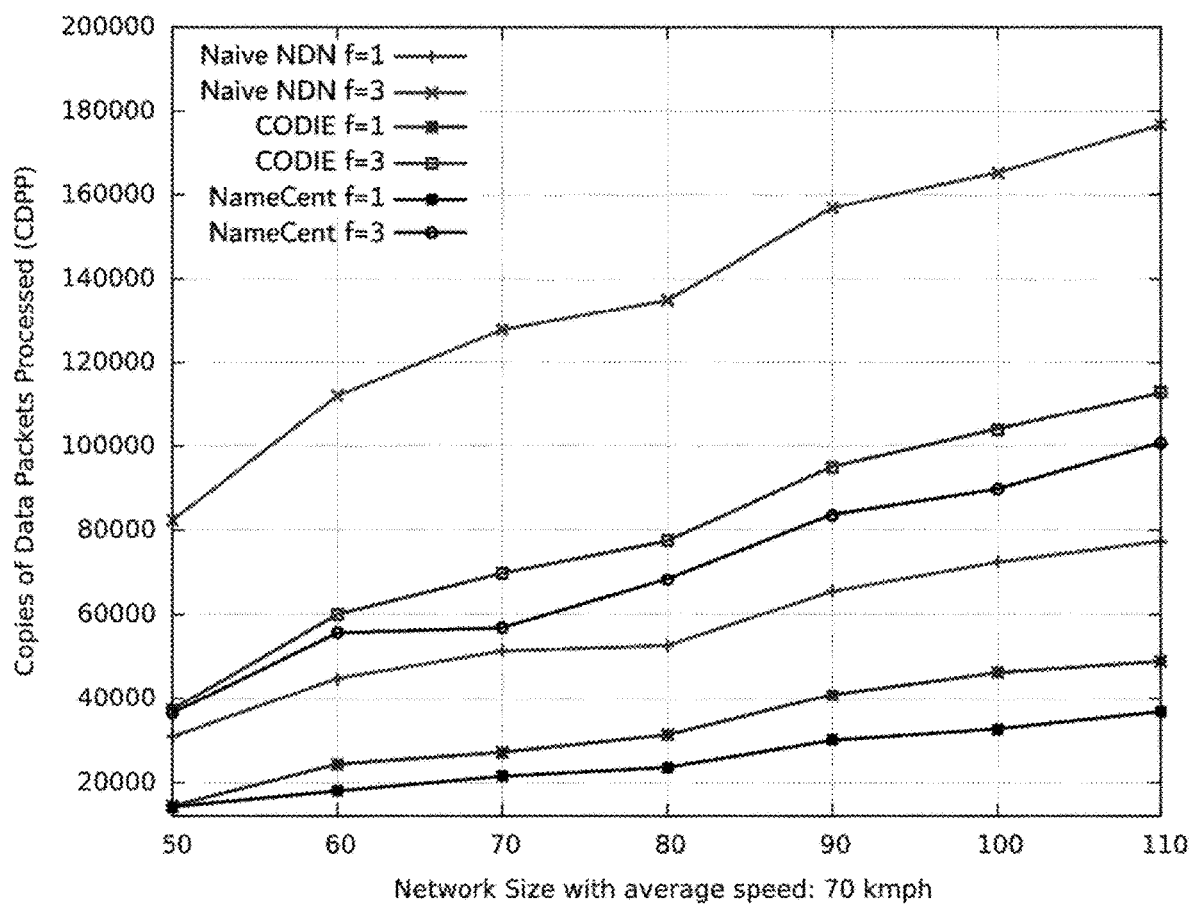
Figure 5C:
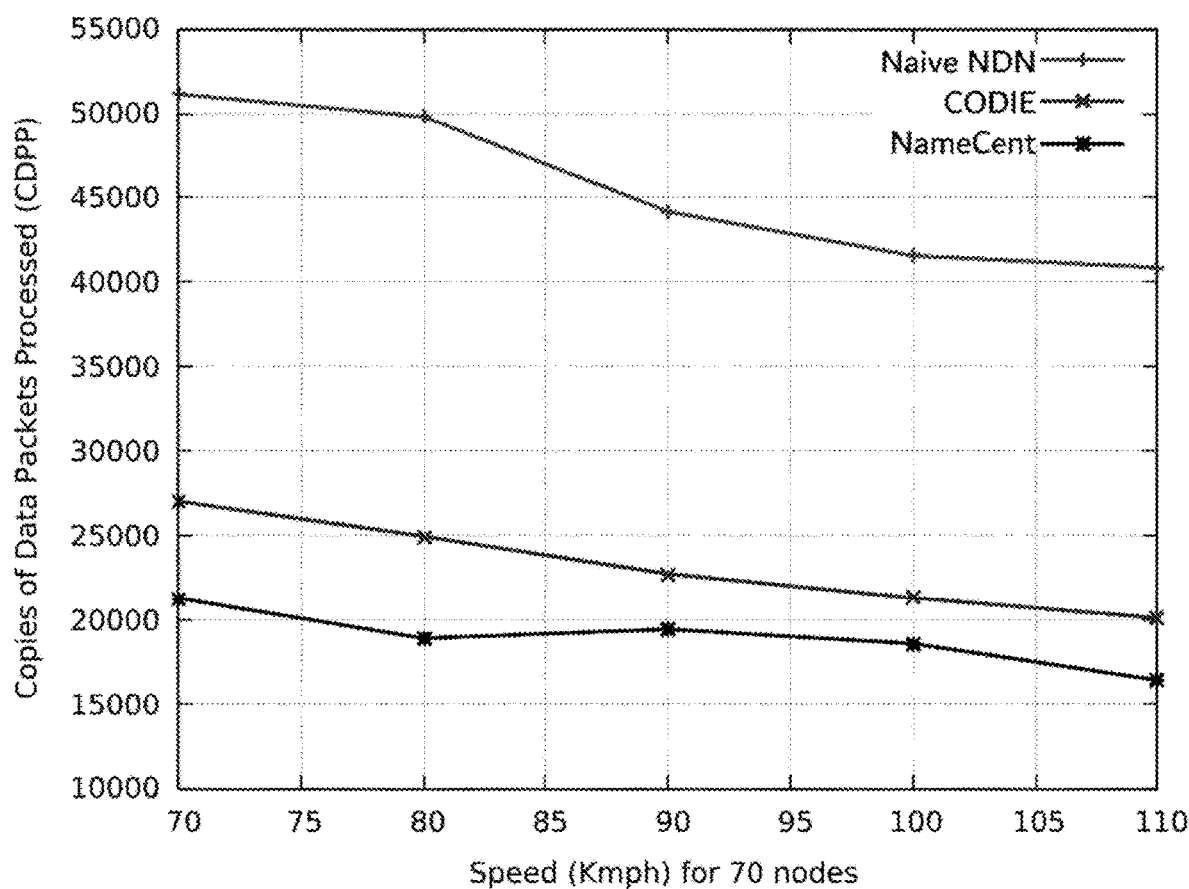

FIGS. 5A to 5C are views respectively illustrating experimental examples of the present disclosure, and illustrate Copies of Data Packets Processed (CDPP) and speed evaluation results of a proposed model (NameCent) of the present disclosure and existing models (NDN and CODIE).

FIG. 5A illustrates a test state of interest packets per second per vehicle (where, speed is 70 kmph and nodes are 70) versus CDPP. FIG. 5B illustrates a test state of network sizes versus CDPP. FIG. 5C illustrates a test state of various speeds for 70 nodes versus CDPP. Referring to FIGS. 5A to 5C, it may be seen that the proposed model, NameCent (in black), significantly reduces CDPP in all speed sections compared to the conventional NDN and CODIE.

Figure 6A:
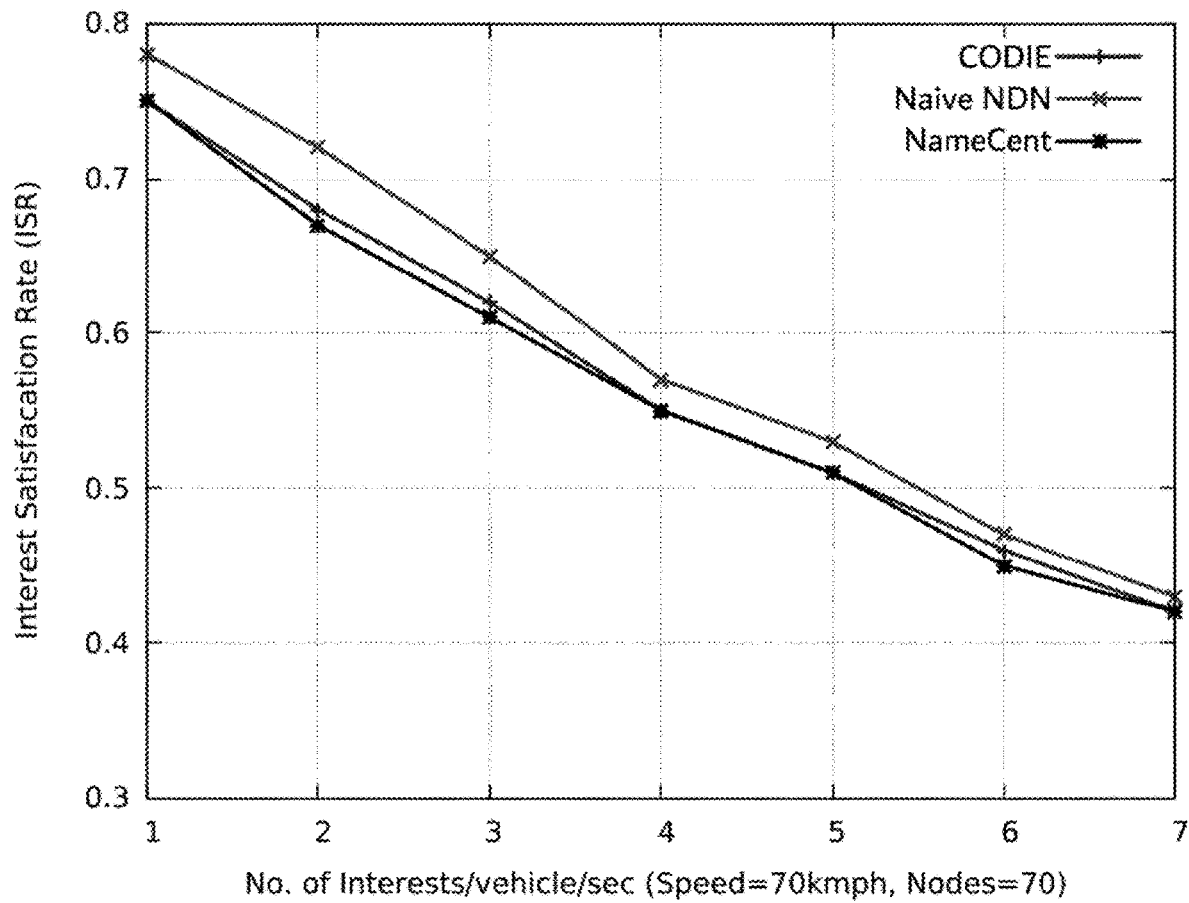
FIGS. 6A to 6C are views respectively illustrating experimental examples of the present disclosure, and illustrate Interest Satisfaction Rate (ISR) performance evaluation of the proposed model (NameCent) of the present disclosure and the existing models (NDN and CODIE).
Figure 6B:
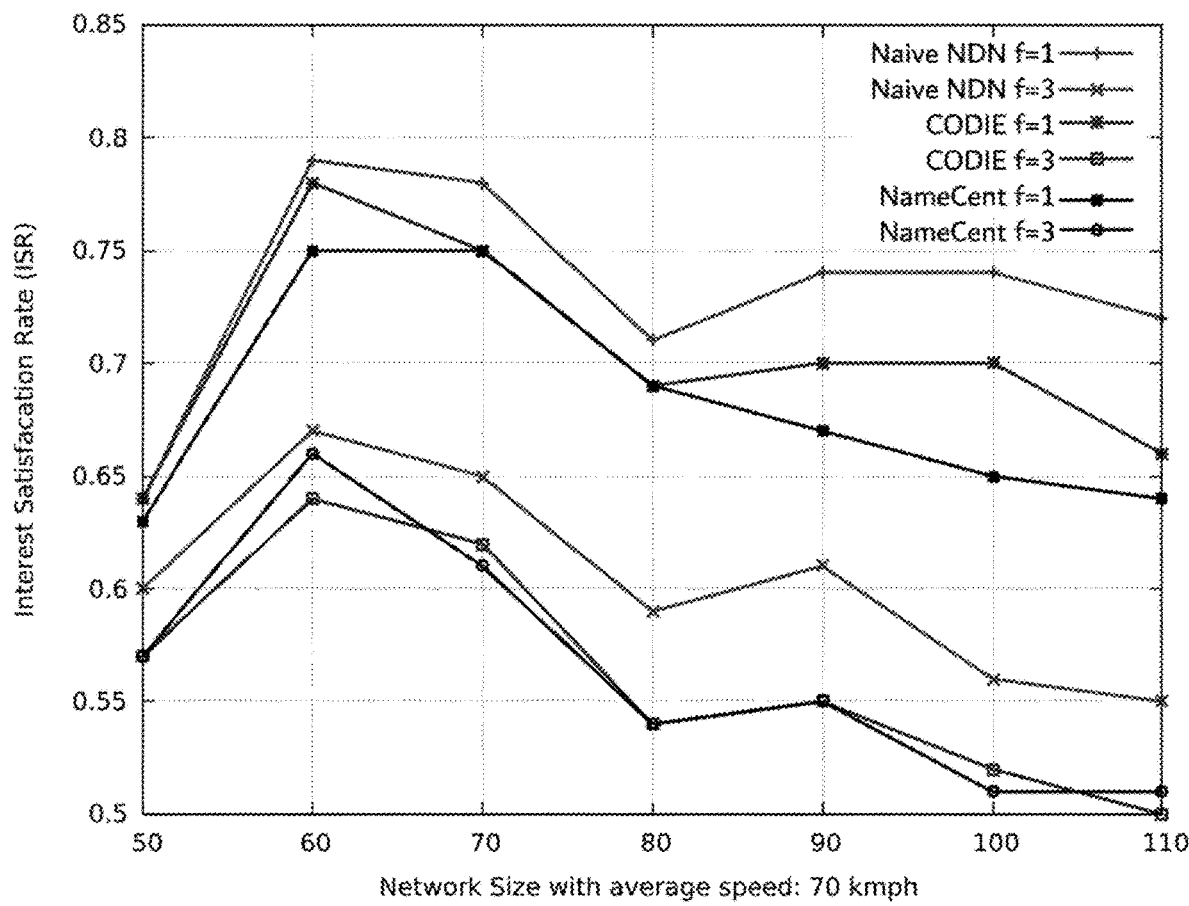
Figure 6C:
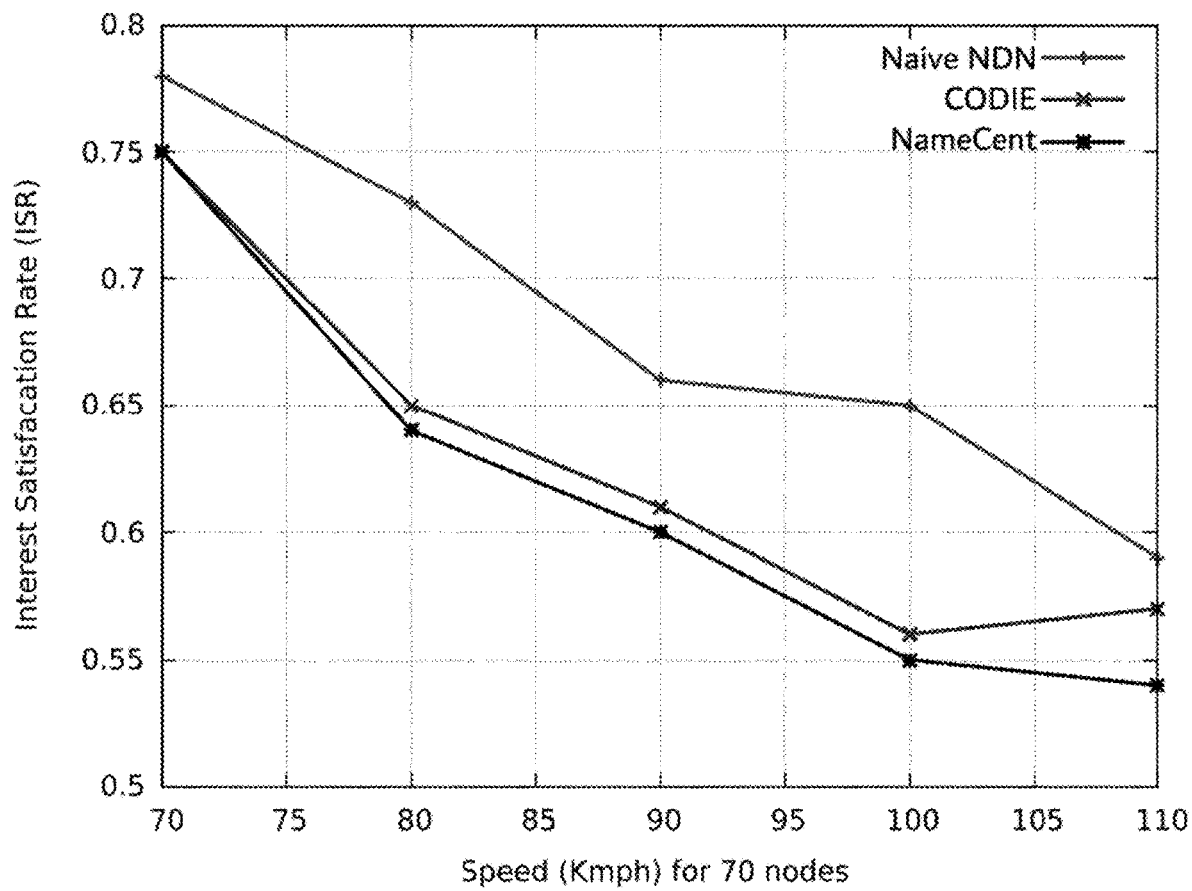

FIGS. 6A to 6C are views respectively illustrating experimental examples of the present disclosure, and illustrate Interest Satisfaction Rate (ISR) performance evaluation of the proposed model (NameCent) of the present disclosure and the existing models (NDN and CODIE). FIG. 6A illustrates a test state of interest packets per second per vehicle (where, speed is 70 kmph and nodes are 70) versus ISR. FIG. 6B illustrates a test state of network sizes versus ISR. FIG. 6C illustrates a test state of various speeds for 70 nodes versus ISR. Referring to FIGS. 6A of 6C, it may be confirmed that the proposed model, that is, NameCent (in black), may achieve a broadcast objective without degrading the Interest Satisfaction Rate.

Figure 7A:
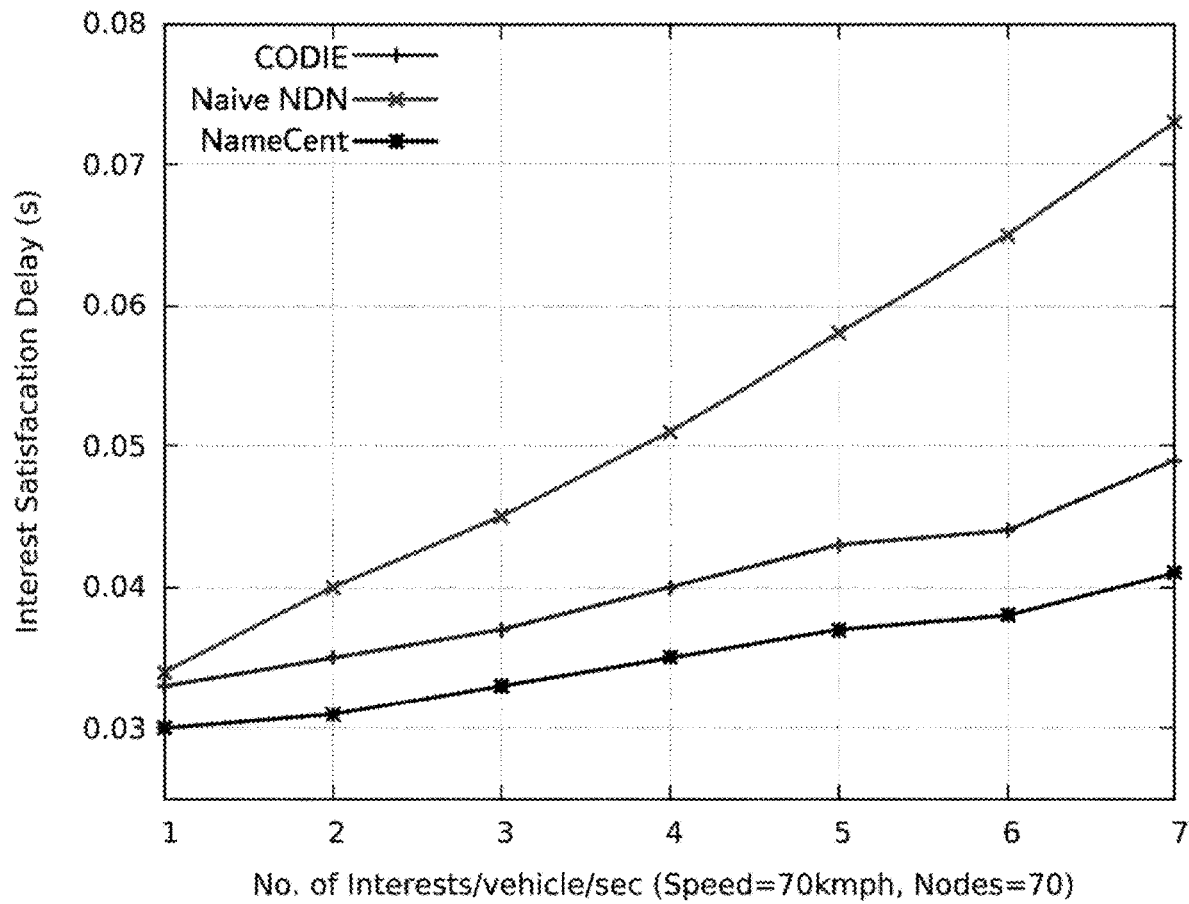
FIGS. 7A to 7C are views illustrating experimental examples of the present disclosure, and illustrate Interest Satisfaction Delay (ISD) performance evaluation of the proposed model (NameCent) of the present disclosure and the existing models (NDN and CODIE).
Figure 7B:
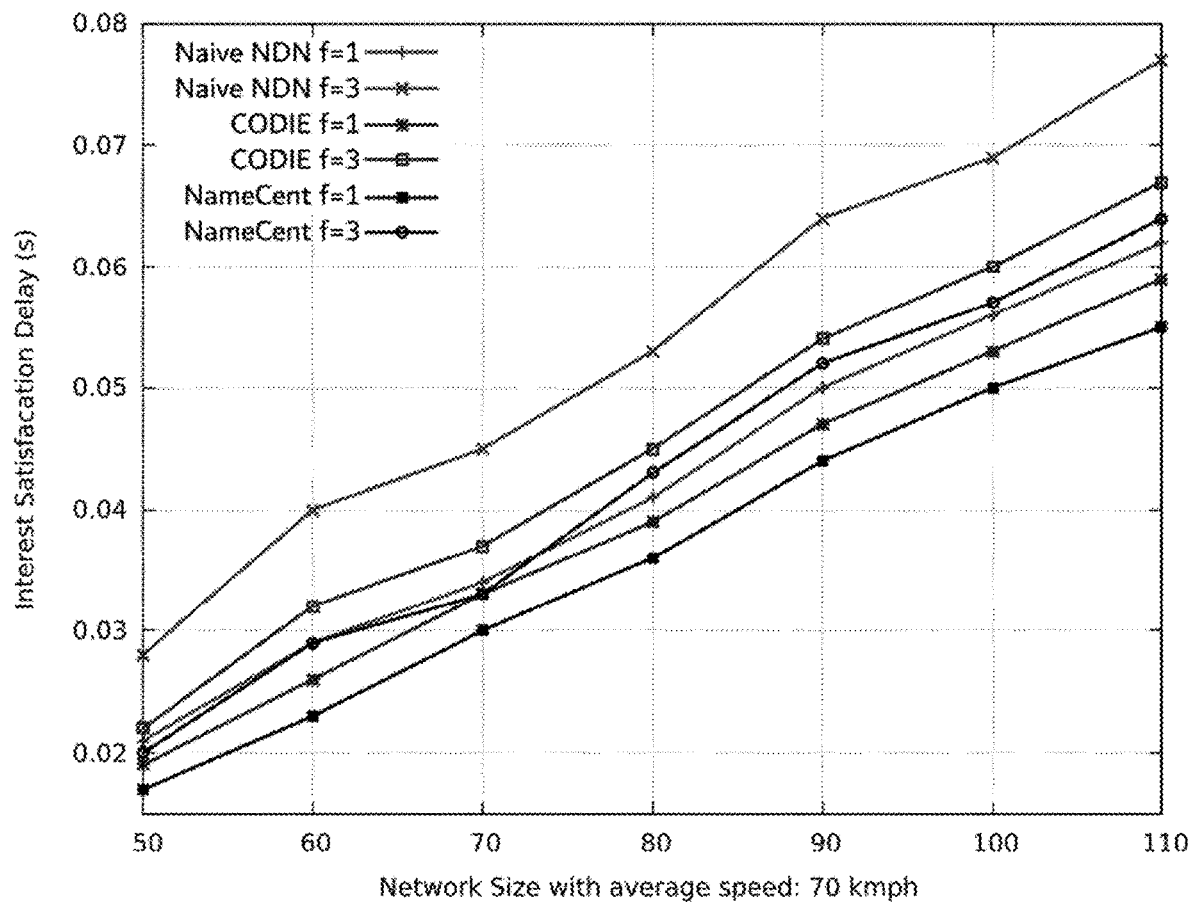
Figure 7C:
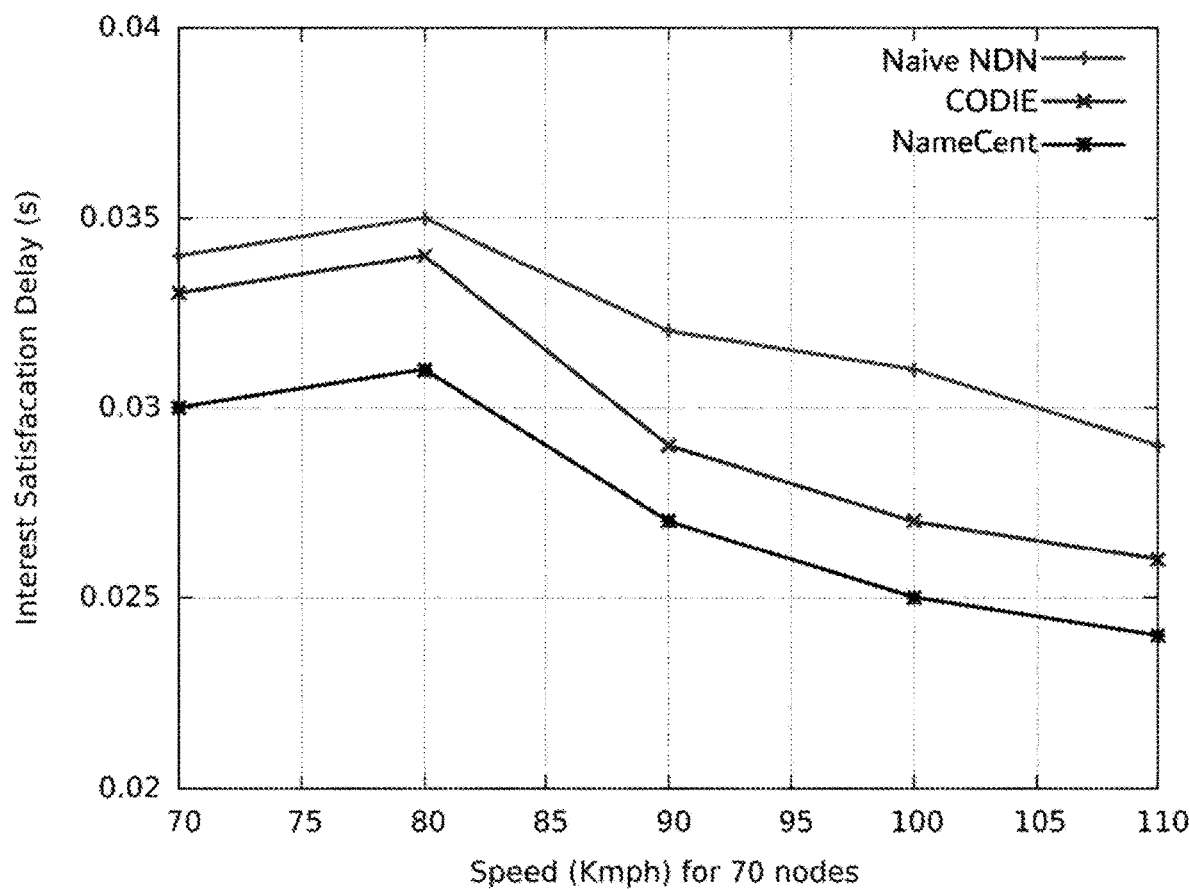

FIGS. 7A to 7C are views illustrating experimental examples of the present disclosure, and illustrate Interest Satisfaction Delay (ISD) performance evaluation of the proposed model (NameCent) of the present disclosure and the existing models (NDN and CODIE). FIG. 7A illustrates a test state of interest packets per second per vehicle (where, speed is 70 kmph and nodes are 70) versus ISD. FIG. 7B illustrates a test state of network sizes versus ISD. FIG. 7C illustrates a test state of various speeds for 70 nodes versus ISD.

Each vehicle has a short duration of connections due to a very dynamic environment and the nature of mobility. Therefore, low ISD is important in the VNDN environment. A very low indicator of ISD has a critical impact on data retrieval, thereby relating to safety as well. Referring to FIGS. 7A to 7C, it may be confirmed that the proposed NameCent (in black) method achieves lower ISDs compared to those of the CODIE and conventional NDN.

Although the present disclosure has been described in detail through the exemplary embodiments above, those skilled in the art to which the present disclosure pertains will understand that various modifications can be made to the above-described exemplary embodiments without departing from the scope of the present disclosure. Therefore, the scope of the present disclosure should not be limited to the described exemplary embodiments, and should be determined not only by the scope of the claims to be described later, but also by any changes or modifications derived from the scope and equivalents of the claims.

What is claimed is:

1. A forwarding method for data broadcast reduction in a Vehicle Named Data Networking (VNDN), the method comprising:

(a) setting name centrality (NameCent) count data with respect to an interest packet received by a node of the VNDN;

(b) measuring, by a Received Signal Strength Indicator (RSSI), a power level of signal received from an access point (AP) or any other vehicle in wireless communication;

(c) calculating a weight of the interest packet for a data forwarder in a current node or a previous node based on the name centrality (NameCent) count data and signal strength measured by the Received Signal Strength Indicator (RSSI); and (d) determining a potential forwarder of a data packet by comparison of variables of the weight calculated in step (c), wherein, in step (c), each weight is calculated with logic of the following equation:

$$W_{in} = \left\{ \alpha \times \left( \frac{RSSI_{Fin}}{RSSI_{max}} \right) + (1 - \alpha) \times \left( \frac{NameCent_{Fin}}{NameCent_{max}} \right) \right\} \quad \text{[Equation 1]}$$

(where, $W_{in}$ denotes weight of requested prefix (n) of forwarder (i), $RSSI_{Fin}$ denotes value of received signal strength indicator, $RSSI_{max}$ denotes maximum value of received signal strength indicator, $NameCent_{Fin}$ denotes name centrality count value of requested prefix (n) of forwarder (i), $NameCent_{max}$ denotes maximum name centrality count value of requested prefix (n) of forwarder (i), and a denotes weight factor).

2. The method of claim 1, wherein, in step (a), by setting, as a variable, an interest of the same content data for which a specific node receives requests from other nodes, a value of counting interests is set as the name centrality (NameCent) count data.

3. The method of claim 2, wherein, in step (a), the set count value of the name centrality (NameCent) is smaller than the number of other nodes adjacent to the specific node.

4. The method of claim 1, wherein step (d) comprises:
constructing a centrality table (CT), wherein a prefix of each node, a weight value ($P_{nw}$) of the previous node calculated in step (c), a weight value ($C_{nw}$) of the current node, and a name centrality count value ($N_{CC}$) calculated in step (a) are stored in a table in which an expiration counter of data storage is set.

5. The method of claim 1, wherein, in step (d), a node having a weight ($C_{nw}$) greater than or equal to a weight ($C_{nw}$) calculated from the current node is determined as a potential data forwarder of the data packet.

6. A forwarding system for data broadcast reduction in a Vehicle Named Data Networking (VNDN), the system providing a content data service to a connected vehicle equipped with a Received Signal Strength Indicator (RSSI) and a sensor node and comprising one or more hardware processors configured to:

(a) set name centrality (NameCent) count data with respect to an interest packet received by a node of the VNDN;

(b) measure, by the Received Signal Strength Indicator (RSSI), a power level of signal received from an access point (AP) or any other vehicle in wireless communication;

(c) calculate a weight of the interest packet for a data forwarder in a current node or a previous node based on the name centrality (NameCent) count data and signal strength measured by the Received Signal Strength Indicator (RSSI), wherein the weight is calculated with logic of the following equation:

$$W_{in} = \left\{ \alpha \times \left( \frac{RSSI_{Fin}}{RSSI_{max}} \right) + (1-\alpha) \times \left( \frac{NameCent_{Fin}}{NameCent_{max}} \right) \right\} \quad \text{[Equation 1]}$$

(where, $W_{in}$ denotes weight of requested prefix (n) of forwarder (i), $RSSI_{Fin}$ denotes value of received signal strength indicator, $RSSI_{max}$ denotes maximum value of received signal strength indicator, $NameCent_{Fin}$ denotes name centrality count value of requested prefix (n) of forwarder (i), $NameCent_{max}$ denotes maximum name centrality count value of requested prefix (n) of forwarder (i), and α denotes weight factor); and (d) determine a potential forwarder of a data packet by comparison of variables of the weight calculated in step (c).

* * * * *